Oct. 28, 1947.  E. BOECKING  2,429,918
MOTION PICTURE PROJECTOR
Filed Oct. 27, 1944  2 Sheets-Sheet 1
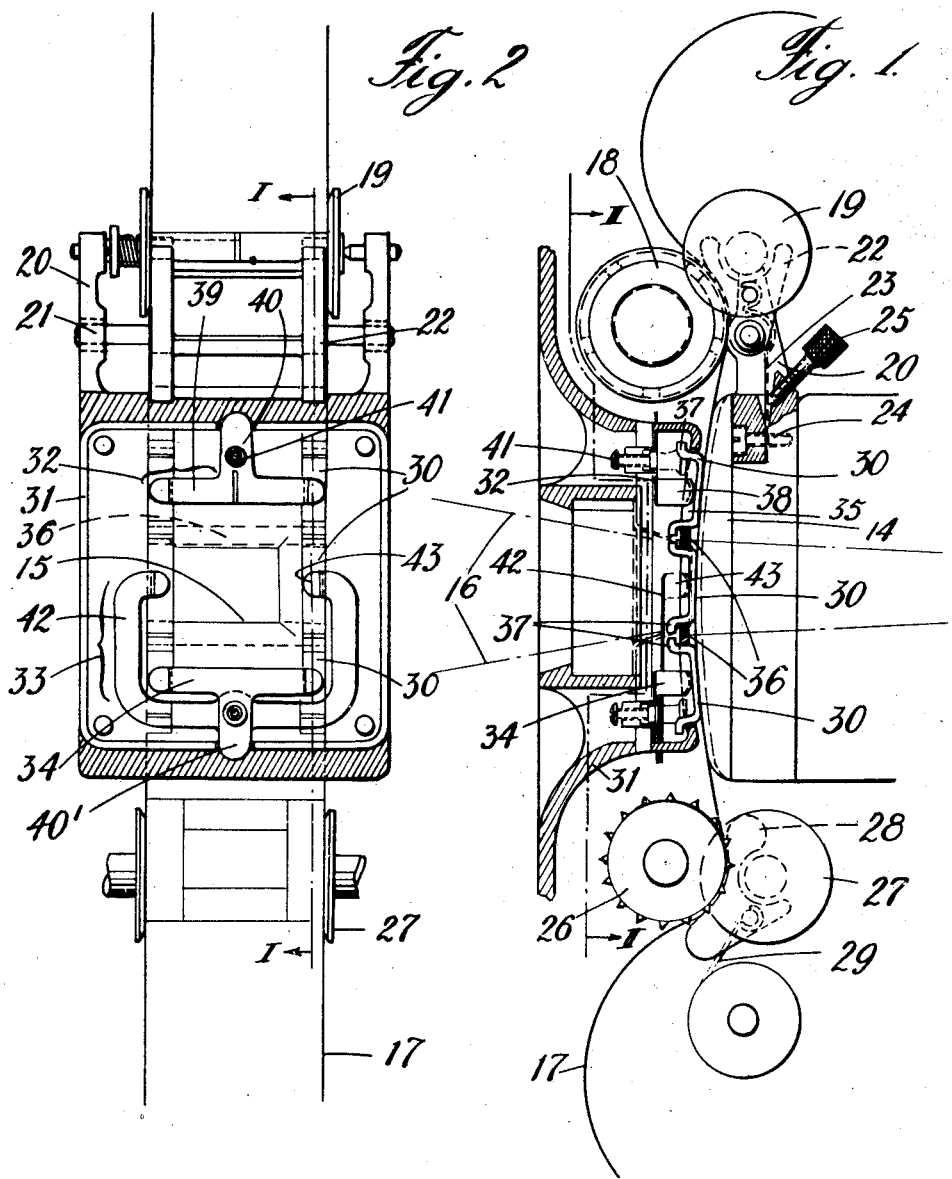
INVENTOR.
EWALD BOECKING
BY his attorneys
Howson and Howson

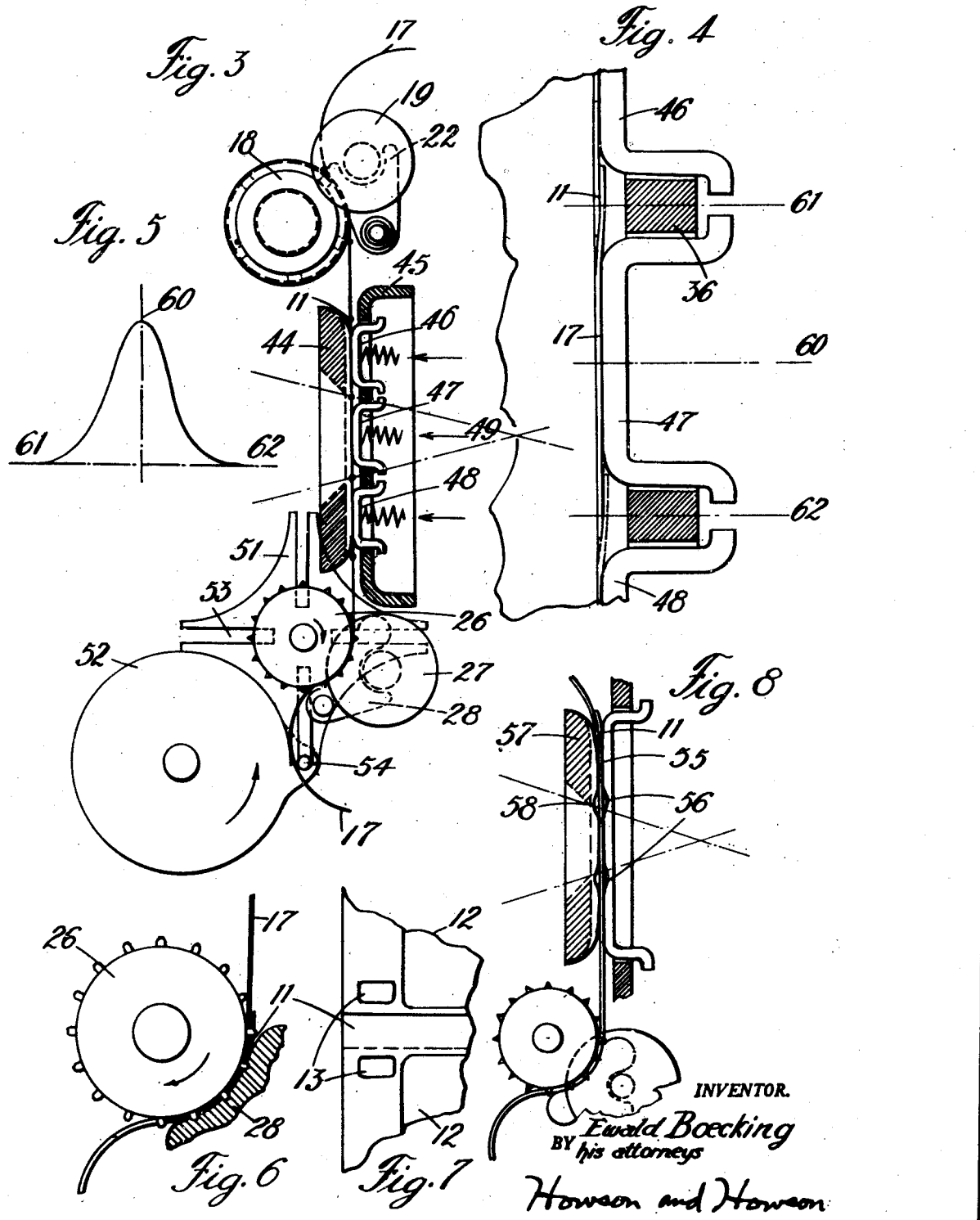

Patented Oct. 28, 1947

2,429,918

UNITED STATES PATENT OFFICE 2,429,918

MOTION-PICTURE PROJECTOR

Ewald Boecking, Great Kills, N. Y., assignor to Manufacturers Machine & Tool Co., Inc., Mount Vernon, N. Y., a corporation of New York Application October 27, 1944, Serial No. 560,654

13 Claims. (Cl. 88—17)

1

This invention relates to a motion picture projector in which the film advances intermittently, and more particularly to pressure shoes for a gate which avoid faulty and noisy projection when a patched film is being used. One object of the invention is to eliminate "jumping" of the image on the screen and noisy clicks when a patch in the film is passing the gate.

In the drawings:

Figure 1 is a side elevation of a film gate and associated mechanism made in accordance with my invention, taken in section at a point opposite the sprocket holes of the film on the line I—I of Fig. 2, the light source coming from the left side of the figure;

Figure 2 is a view in elevation of the novel film gate pressure shoes and associated elements of Fig. 1, the view being taken from the direction of the source of light on the line II—II of Fig. 1;

Figure 3 is a side elevation in section similar to Fig. 1, of a modified form of film gate, taken from the opposite side of the machine from Fig. 1;

Figure 4 is a detail view on a larger scale of one of the pressure shoes of the film gate of Fig. 3;

Figure 5 is a graph illustrating the variation in speed of movement of the film while advancing one frame;

Figure 6 is a detail view on an enlarged scale of the driving sprocket wheel and yoke of Fig. 3;

Figure 7 is a detail view of part of a typical film patch; while

Figure 8 is a view similar to Fig. 3 of another modified form of film gate in which a single pressure shoe is used.

In the ordinary commercial form of motion picture projector where the film is advanced intermittently, it has been observed that a clicking noise occurs in the machine and a "jump" occurs in the image on the screen whenever a patch in the film is passing through the gate. This clicking noise is quite loud, and the slight jumps upward of the film which occur at this time make a distinct jump in the picture as projected. I have discovered how these faults can be eliminated by proper construction and location of the pressure shoes for the film gate of the projector.

In order to project a film properly, it is necessary that it be held against a fixed element or gate while the picture is being projected, and that one or more pressure shoes be used on the opposite sides of the film to hold it against the gate. This shoe is customarily longer in a vertical dimension than one frame of the picture. In the ordinary projector the film has very rapid intermittent movement. As shown in Fig. 5, the advancement of the film one frame involves increasing the speed of the film very rapidly from zero to the maximum speed and immediately slowing it down to zero by the time the film has advanced one frame. A picture is projected each time the film is stationary. The location of patches on motion picture films is uniform with regard to the frames of the successive pictures, and this customary manner of patching is shown in Fig. 7. It will be seen that the patch 11 is centered between two successive pictures 12 covering practically all of the space between the two pictures. By locating the patch in this manner there is no chance of the patch being projected on the screen. It therefore follows that the patch will be located successively just above the light aperture of the film gate and then just below it as the film advances. I preferably provide a multiplicity of pressure shoes whose pressure faces are each equal in length to about one of the pictures, i. e., one picture frame minus one film patch, and space them apart a distance about equal to the width of the patch 11. If I provide a single pressure shoe, its face is recessed at points spaced apart the distance of one frame, with its recesses each about equal to the width of the patch. While for ease of description in this specification I sometimes speak of a "pressure shoe," it will be obvious that the shoes ordinarily come in pairs—one near each edge of the film.

These separate shoes or the recesses in the single long shoe are so located with regard to the film gate that while the frame is stationary and the picture is being projected on the screen, the patches 11, if any, are in the spaces between the shoes or opposite the recesses in the single shoe. It will be obvious that at this moment the pressure shoes are in complete contact with the film and holding it against the film gate at all points. I have discovered that the clicking noise is due to the leading edge of the patch contacting a pressure shoe, and I have found that by arranging the pressure shoes as above described, the patch is moving at a very low speed when it first contacts the shoe. This eliminates the clicking.

The explanation as to why the arrangement I have described eliminates the jumping of the film due to the patch is as follows. As is well known, the sprocket holes 13 in the edges of the film are somewhat larger than the sprocket teeth themselves, so that if at any time the drag on the film is changed, the forward movement of the film may cause a jump. When a patch has forced its way between the film gate and the pressure shoe, the pressure shoe has been tipped back so as to reduce its contact and pressure on the film. I have found that in the machines now on the market the pressure shoe begins to be lifted by a patch, or has a patch just leaving it at its highest or maximum speed, which is about fourteen feet a second. As a result, the pressure shoe is late and is not down firmly against the film at the time that the film movement should stop. The film therefore tends to move a little further than necessary and advances until the back of the sprocket hole contacts the tooth on the sprocket wheel. This makes a considerable upward move on the projection screen when the patch comes to this point. The same jump will occur again when the frame following the patch is projected. In a projector made in accordance with my invention, in the preferred embodiment, the film patch has just contacted the pressure shoe as the film slows down and comes to a stop. In this way the patch is so close to the leading edge of the pressure shoe that the contacting which makes the noise and the strain which causes the jumping are distributed over the slow-moving portion of the cycle of movement of the film, thus eliminating all noise and so distributing the strain as to eliminate the jump. By thus having each pressure shoe shorter than the movement of one frame of the film or one "film stroke," and so located that a patch will lift the shoe only at the beginning or the end of each stroke, the shoe is lifted and lowered on time and there is no resulting jump. While the single long pressure shoe such as shown in Fig. 8 with the properly located recesses will give the advantages of my invention, the best results are obtained if two or more pressure shoes are provided at the gate, so that while one shoe is lifted at least one or two others are holding the film tight, the lifted shoe of course coming down toward the end of the film stroke and also helping to hold the film. Thus all shoes are holding at the end of the stroke.

Turning now to the preferred embodiment shown in Figs. 1 and 2, there is the film gate 14 through which the light 16 is adapted to pass from left to right, as viewed in Fig. 1. As shown in the drawings, the face of the gate 14 over which the film 17 passes is convex, for the reason which will be described subsequently, the convexity facing toward the source of light and the film being between the source of light and the film gate. Before the film 17 reaches the film gate 14, it passes over part of the periphery of a fixed retarding or hold-back roller or threading register 18. This hold-back roller is located on the opposite side of the film from the film gate. To hold the film in contact with this threading register, there is a roller 19 mounted on an upward extension 20 of the film gate which guides the film laterally onto the hold-back roller 18. Also mounted on this upward extension 20 of the film gate by means of a pivoted shaft 21, is a double guiding yoke 22 adapted to overlie the lines of sprocket teeth on the two sides of the film 17. The upper end of this yoke straddles the central portion of the lateral guide roller 19 and is pressed against the film by a spring 23. This spring 23 is mounted in the film gate by screws 24 and its pressure against the yoke is adjusted by a screw 25. Below the film gate the film 17 is in contact with the main driving sprocket wheel 26, and here again the film has a lateral guide roller 27 and yoke 28 to hold the film against the roller, and a spring 29 to keep the yoke in contact with the film. The parts as thus far described are not sought to be covered by this particular application, this invention being more particularly concerned with the spacing of the parts and with the pressure shoes or pads which hold the film in contact with the film gate. These pressure shoes and the means mounting and holding them in position are all located on the opposite side of the film from the film gate, which, in the example shown in Figs. 1 and 2, is the side of the film toward the light source. In other words, the light is coming from the left in Fig. 1. In the embodiment shown in Figs. 1 and 2, there are three pressure shoes or pads 30 arranged one above the other on the light source side of the film. These project through three openings 35 in a plate 31, and there are springs 32, 33, 34 for pressing the shoes resiliently against the film. These shoes and their holding plate and springs are of course so constructed as not to obstruct the light passage or aperture in the gate. Therefore the shoe-holding plate 31 contains an opening 15 in the bottom of its face which is toward the film gate, this opening corresponding roughly to one picture frame in size and location, and being in registry with the opening 35 for the center shoe. Dividing the three openings 35 are cross bars 36 forming part of the face of the holding plate, these bars being closely adjacent the opening.

As shown in Figs. 1 and 2, the shoes are made in pairs with one shoe of the pair for one edge of the film and the other shoe for the other edge. Each shoe consists of a strip of flat metal with its ends bent backwardly and then turned outwardly again, the central forward portion just fitting in the opening between the cross bar 36 and the neighboring cross bar or the end of the shoe-holding plate 31. The outwardly bent ears or ends 37 lie on the back side of the cross bar or an end of the shoe-holding plate 31, as the case may be. The central portion or pressure surface of each shoe is shaped to conform to the surface of the film gate against which it is pressing. Each shoe is pressed against the film gate by an end of a flat spring 32, 33 or 34. The spring 32 for the upper shoe comprises a flat cross piece extending from the shoe element on one side of the film to the shoe element on the other, with turned-down edges or ends 38 reaching down to the central portion of the shoe element. The cross piece 39 is unitary with an upwardly extending arm 40 which is fastened to the shoe-holding plate by an adjustable screw 41. The spring 34 for the lower shoe is similar to the spring 32 for the upper shoe except that the downwardly extending arm 40' corresponding to the upwardly extending arm 40 of the spring 32 is shorter. The spring 33 for the middle shoe, however, must be of different shape. This spring 33 is mounted under the screw 41 which holds the lower spring 34. The middle spring comprises two flat arms 42 which extend laterally from points opposite the screw 41 to a position beyond the edge of the film. These lateral extensions are continued upwardly to points opposite the middle of the light aperture 35 when they turn in over the elements of the shoe 30 at the middle and have downwardly extending ears 43 similar to the downwardly extending ears 38 on the springs 32 and 34 of the upper and lower shoes.

With this arrangement of springs it will be seen that each of the three shoes 30 is spring-pressed independently of the other two and therefore as a patch progresses past the film gate only one of the three shoes at a time will be momentarily tipped so that it is partially out of contact with the film, and even that tipping will occur only at a time when the light aperture is closed.

In Figs. 3 and 4 I have shown a simplified construction in which the film gate 44 exhibits a flat surface. In Fig. 3 the light source 49 is at the right and the film gate 44 is therefore to the left of the film 17. The shoe-holding plate 45 is therefore also flat on the side which faces toward the film gate and the shoes 46, 47, 48 (reading from top to bottom) also present flat surfaces to the film. For clarity, the spring pressure means are shown diagrammatically in Fig. 3 and omitted entirely from Fig. 4. The small dots or beads on the film are a diagrammatic method of showing the center points of patches 11 in the positions they will occupy at the moment that the light aperture is opened and the picture is being projected on the screen. These positions, in point of time, correspond in Fig. 5 with the points 61 and 62 where the film is at zero rate of movement. These film points 61 and 62 in Fig. 5 are spaced apart a distance equal to a movement of the film corresponding to one picture frame. The point of maximum speed intermediate the zero points is marked 60 in Figs. 4 and 5 and is half way between those points. As in the case of the construction shown in Figs. 1 and 2, the cross bars 36 come opposite the points at which the patches are located while the film is being projected on the screen.

For presenting the film to the film gate and the pressure shoes, the same hold-back or threading register 18, lateral guide roller 19 and guide yoke 22 can be used. To draw the film past the film gate, the usual sprocket wheel 26 turning in the direction indicated by the arrow can be used along with the same lateral guide roller 27 and yoke 28 of Figs. 1 and 2. As already stated, a very rapid intermittent motion is required on moving picture projectors. The film is not moved continuously, but each picture frame on it is drawn down to the projecting position while the shutter is closed and the film remains stationary for the fractional part of a second while the light aperture is open and the picture is being exposed on the screen. Then the shutter is again closed and the next successive view or frame is moved to the projecting position.

In Fig. 3 I have shown briefly a common form of Geneva wheel mechanism for driving the sprocket wheel with the intermittent motion necessary to cause the film to take this speed cycle shown in Fig. 5. In this embodiment there is a driven wheel 51 on the same shaft with the driving sprocket wheel 26, and a driving element 52. The wheel 51 and element 52 combine to give the intermittent motion for the film. To this end the driven wheel has four radial slots 53 driven by a pin or roller 54 on the periphery of the driving member 52. The details of this movement are too well known to need further elaboration here. With this mechanism the driven wheel makes a one-quarter revolution every complete revolution of the driving wheel 52. The film therefore is advancing for one quarter and standing still for three quarters of the time.

In Figs. 6 and 7 I have shown the relation of the sprocket holes 13 in the film to the driving sprocket wheel 26, and it will be observed that here also the location of the splice and the location of the sprocket wheel 26 and the yoke 28 with relation to the film gate is such that when the film is stationary the splice is just about to begin its engagement with the yoke 28. In other words, here also the machine is so built that a click is avoided by having the engagement of the splice with the elements or members begin while the film is moving at very slow speed. In addition, I find it helpful to space the top roller 18 and yoke 22 so that any splice or patch will just be ready to contact the yoke when the film is stationary. Similarly to the shoes, it is also preferable to have the arc of contact of the yoke 22 and roller 18 and of the sprocket wheel 26 and pressure yoke 28 less in length than one picture frame. In fact, as shown for example in Fig. 4, I prefer to have the patch just come in contact with the shoe as the film slows down and comes to a stop.

The modification shown in Fig. 8 is one in which a single pressure shoe 55 is used which is long enough to cover three picture frames. In order that this shoe may function in accordance with my invention, it is recessed or cut out at the points 56 where the film patches will be located while the film is stationary. In this modification I also find it preferable to recess the film gate 57 at the points 58 opposite the recesses 56 in the pressure shoe 55. In this construction the full frictional pressure which is needed is applied to the film at the time it is slowing down to zero, and the movement of the film is so slow at the time the patch first contacts the gate that all noise is eliminated. The frictional pressure of course serves to hold the film and eliminate the jumping.

In Fig. 1 the film gate is shown as having a radius of curvature, the center of which radius is to the right of the gate, i. e., toward the projection screen. This radius of curvature is such as to make proper correction for what would otherwise be the failure of the projected picture to be in focus both at the midpoint of the frame and the top and bottom of the picture simultaneously. This also eliminates any longitudinal curving or buckling of the film. This means of correcting this focal error is not claimed in the present application.

It will be obvious that many variations from the embodiments shown in the drawings, which do not depart from the scope of my invention, will occur to those skilled in the art.

I claim:

1. In an intermittent motion picture projector, a film gate, in combination with shoe means pressing the film against the gate, said shoe means providing one or more recesses in which any patches on the film will rest while the film is stationary, whereby clicking and jumping of the film are prevented.

2. In an intermittent motion picture projector, a film gate, in combination with pressure shoe means therefor, said shoe means providing one or more recesses separated by pressure surfaces, each surface of an effective length of one picture frame minus one film patch and said surfaces so located that any film patches will fall outside said surfaces when the film is stationary, whereby any patches in the film will be prevented from clicking and causing jumping of the film.

3. In an intermittent motion picture projector, a film gate, in combination with a plurality of adjacent pressure shoes, said shoes each being less in film-contacting length than one picture frame by an amount equal to the extent of one film patch, and one shoe being opposite the light aperture in the film gate, said shoes being spaced apart a distance equal to a film patch, whereby any patches in the film will rest between the shoes when the film is stationary.

4. In an intermittent motion picture projector, a film gate, in combination with a plurality of pairs of pressure shoes, said pressure shoes being independently and resiliently pressed against the film opposite the gate and one of said pairs of shoes being opposite the light aperture in the gate, said shoes each being the amount of one film patch less in film-contacting length than one picture frame and the space between two adjacent shoes, center to center, being equal to the length of one picture frame, whereby at the moment a film comes to rest, full pressure of the shoes will be exerted against the film, avoiding jumping.

5. In a motion picture projector in which the film is advanced intermittently, a film gate having a light aperture therein, in combination with a plurality of pressure shoes adapted to hold the film against the gate, said shoes each being equal in film-contacting length to one picture frame minus one film patch and spaced apart a distance equal to the space between two picture frames, said pressure shoes being so located that maximum friction by the shoes occurs when the film is coming to a stop.

6. In an intermittent motion picture projector having a film gate with a light aperture therein and a plurality of pairs of shoes adapted to press the film against the gate, the provision of a pair of pressure shoes, one for each edge of the film opposite the light aperture, said pair of shoes each being one film patch less in film-contacting length than one picture frame, said pair of shoes being so located that as the film comes to a stop any patches on the film will be between the shoes, whereby the contact of the patches with the following shoe occurs at low film speed and clicking is avoided.

7. In an intermittent motion picture projector having a film gate with a light aperture therein and a plurality of pairs of shoes adapted to press the film against the gate, the provision of a pair of pressure shoes, one for each edge of the film opposite the light aperture, said pair of shoes each being one film patch less in film-contacting length than one picture frame, said pair of shoes being so located that as the film comes to a stop any patches on the film will just contact the next shoe without perceptibly tipping it, whereby the contact of the patches with the shoe occurs at low film speed and clicking is avoided.

8. In a motion picture projector, means for advancing a film intermittently one picture frame at a time, and a film gate, in combination with a plurality of pairs of pressure shoes each less in length than a picture frame by the amount of space between two pictures and spaced apart, center to center, the length of one picture frame, said shoes being so located that when the film is stationary any patches on the film lie between the shoes.

9. In a motion picture projector, a film gate, means for advancing the film intermittently one picture frame at a time, comprising a member located after the film gate to pull the film intermittently and a pressure member bearing against said pulling member, in combination with a plurality of pairs of pressure shoes opposite the film gate, each less in length than a picture frame by the amount of space between two pictures and spaced, center to center, a distance equal to one frame, said shoes and pressure member being so located with regard to the movement of the film that when the film is stationary any patches in the film lie between the shoes or just about to contact the pressure member.

10. In an intermittent motion picture projector, a film gate, two or more pairs of pressure shoes each having a film-contacting surface the length of one picture frame minus one film patch and spaced apart, center to center, the length of one picture frame, a cylindrical-shaped film-retarding member and pressure means each having a film-contacting surface the length of one picture frame minus one film patch, located in advance of the film gate, in combination with an intermittent driving sprocket and pressure means each having a film-contacting surface the length of one picture frame minus one patch, located after the film gate, said film-retarding slide and pressure means and intermittent sprocket and pressure means being so located with regard to the film gate that the center of said pressure means surface length is on a line with the center of any picture frame when the film is stationary.

11. In an intermittent motion picture projector, a film gate, in combination with a pair of shoes pressing the film against the gate, each shoe having a film-contacting surface the length of one picture frame minus one film patch and said shoes being so located on the film gate that any patches in the film will always be outside of said shoe film-contacting surface when the film is stationary.

12. In an intermittent motion picture projector, a film gate having two or more pressure shoes on each edge of the film, said shoes each having a film-contacting surface the length of one picture frame minus one film patch, and spaced apart a distance equal to a film patch, whereby any patches in the film will rest between the shoes when the film is stationary, so that clicking, jumping and buckling of the film are prevented.

13. In a motion picture projector, a film gate, means for advancing the film intermittently one picture frame at a time, comprising members located before and after the film gate to pull the film intermittently and a pressure member bearing against said pulling member, in combination with a plurality of pairs of pressure shoes opposite the film gate, each less in length than a picture frame by the amount of space between two pictures and spaced, center to center, a distance equal to one frame, said shoes and pressure members being so located with regard to the movement of the film that when the film is stationary any patches in the film lie between the shoes or just about to contact a pressure member.

EWALD BOECKING.

REFERENCES CITED

The following references are of record in the file of this patent:

UNITED STATES PATENTS

| Number | Name | Date |
| --- | --- | --- |
| 1,074,177 | Huntoon | Sept. 30, 1913 |
| 1,728,670 | Dina | Sept. 17, 1929 |
| 1,922,742 | Mitchell | Aug. 15, 1933 |

FOREIGN PATENTS

| Number | Country | Date |
| --- | --- | --- |
| 177,002 | Great Britain | Mar. 23, 1922 |